United States Patent [19]

Tilley

[11] Patent Number: 4,721,606
[45] Date of Patent: Jan. 26, 1988

[54] RECOVERY OF METAL VALUES FROM SPENT CATALYSTS

[75] Inventor: George L. Tilley, Costa Mesa, Calif.

[73] Assignee: Union Oil Company of California, Los Angeles, Calif.

[21] Appl. No.: 640,241

[22] Filed: Aug. 13, 1984

Related U.S. Application Data

[63] Continuation of Ser. No. 409,846, Aug. 20, 1982, abandoned.

[51] Int. Cl.[4] .................... C01G 39/00; C01G 31/00; C01G 53/00; C01G 51/00
[52] U.S. Cl. ........................... 423/54; 423/63; 423/68; 423/112; 423/122; 423/128; 423/132; 423/139; 423/140; 423/150
[58] Field of Search ............... 423/128, 140, 131, 150, 423/130, 139, 132, 145, 122, 556, 150, 54, 53, 63, 37, 112, 113, 68; 252/417; 502/27

[56] References Cited

U.S. PATENT DOCUMENTS

| | | | |
|---|---|---|---|
| 2,945,737 | 7/1960 | Hoekstra | 423/132 |
| 3,079,228 | 2/1962 | Skay | 423/132 |
| 3,193,345 | 7/1965 | Marsh | 423/132 |
| 3,393,975 | 7/1968 | Mitchell et al. | 423/113 |
| 3,567,433 | 3/1971 | Gutnikov | 423/150 |
| 3,667,905 | 6/1972 | Jennings | 423/556 |
| 4,024,218 | 5/1977 | McKay et al. | 423/145 |
| 4,120,934 | 10/1978 | Miöen | 423/132 |
| 4,289,605 | 9/1981 | Bartholic | 423/37 |
| 4,343,774 | 10/1982 | Tilley | 423/53 |

FOREIGN PATENT DOCUMENTS

1550964  8/1979  United Kingdom .

OTHER PUBLICATIONS

G. M. Ritcey and A. W. Ashbrook, Solvent Extraction, Principles and Applications to Process Metallurgy, Part II, Elsevier Scientific Publishing Co., New York, 1979, Chapters 4.9, 4.10 and 4.19.
"Solvent Extraction in Sumitomo's Cobalt Refining Process", paper by M. Fiyiimori, N. O. no, S. Itassko and I. Fukui, at Canadian Institute of Mining and Metallurgy, 10th Annual Hydrometallurgy Meeting, Oct. 26–28, 1980.
Nishimura Saji, "Recovery of Valuable Metals from Waste Catalyst", Oct. 30, 1976, app. 75/50,370, abstracted in Chem. Abs., vol. 86, 1977, 86:45888n.

Primary Examiner—Robert L. Stoll
Attorney, Agent, or Firm—Dean Sanford; Gregory F. Wirzbicki; Robert A. Franks

[57] ABSTRACT

Spent catalysts from hydrocarbon refining processes, comprising transition metal compounds on aluminum oxide-containing supports, are subjected to an oxidative roasting and are treated with sulfuric acid in a countercurrent digester to dissolve metals. Following operations to separate compounds of the various transition metals, a solution containing approximately stoichiometric equivalents of aluminum and sulfate is obtained.

29 Claims, 2 Drawing Figures

RECOVERY OF METAL VALUES FROM SPENT CATALYSTS

This application is a continuation of application Ser. No. 409,846 filed Aug. 20, 1982, now abandoned.

BACKGROUND OF THE INVENTION

1. Field of the Invention

The invention relates to a method for recovering metal values from catalyst materials, and more particularly to catalyst materials which have been used in hydrocarbon refining processes, comprising compounds of cobalt, nickel, molybdenum and vanadium on supports which contain aluminum oxide.

2. Description of the Invention

Catalytic hydrorefining, that is, catalyzed reaction under conditions of elevated temperature and pressure in the presence of hydrogen, has become a most useful part of hydrocarbon refining, facilitating the conversion of shale oils, petroleum distillates and residua to various more valuable products. Hydrorefining units are typically capable of prolonged on-stream operation, but suffer from progressively lessened efficiency during operation due to deactivation of the catalyst.

Hydrorefining catalysts are usually comprised of a porous inorganic support, normally one or more refractory oxides such as alumina, silica-alumina composite, amorphous or crystalline aluminosilicates, and the like, impregnated with compounds of a Group VI-B metal (e.g., molybdenum) and a Group VIII metal (e.g., cobalt and/or nickel). Also utilized in such catalysts, but less frequently, are tungsten, titanium, magnesium and several other elements.

A common hydrorefining catalyst, for example, comprises up to about 20 percent by weight molybdenum (calculated as $MoO_3$) and about 2 to 6 percent by weight nickel or cobalt (calculated as NiO or CoO), on a particulate support of porous alumina. This type of catalyst is customarily utilized for the hydrogenation of crude oil distillates. The cobalt-containing catalyst also has found wide utility in the hydrodesulfurization treatment of petroleum residual oils, which contain impurities such as sulfur, nickel and vanadium at much higher levels than are found in distillates.

Prior to use, the hydrorefining catalyst is "sulfided" by treatment with hydrogen sulfide or compounds which will form hydrogen sulfide in the presence of hydrogen, e.g., mercaptan compounds. As a result of this treatment, the molybdenum and cobalt or nickel is at least partially present on the catalyst as a metal sulfide.

During operation of the hydrorefining process, carbonaceous deposits accumulate on the catalyst particles, thereby inhibiting the catalyst activity. In addition, but at a much slower rate, the metallic impurities nickel and vanadium (as well as lead, iron and other trace elements present in the hydrocarbon feedstock) also form inhibiting deposits on the catalyst. This metal accumulation is, of course, more acute for the treatment of residua, due to the higher impurity levels in such material.

When the catalyst activity has been reduced to an unacceptable level by deposit accumulation, it is customary to restore a large proportion of the previous effectiveness by a regeneration procedure, involving heating the catalyst at elevated temperatures in the presence of an oxygen-containing gas. This rather efficiently removes the carbonaceous deposits, but does not affect the metallic compound deposits. Consequently, after several regenerations, the catalyst must be removed from service and replaced.

It will be appreciated that the metals contained in a spent catalyst, as described, have a substantial value. For a catalyst used in the hydrodesulfurization of residual oils, deposits of as much as about 5 percent by weight nickel (calculated as NiO) and up to about 20 percent by weight vanadium (calculated as $V_2O_5$) accumulate on the particles during their useful lifetime. In addition, the original amounts of molybdenum and cobalt or nickel remain in the catalyst particles, although their concentrations are made lower due to the dilution effect of accumulated deposits. Since large quantities of catalyst are used in the refining of petroleum, a number of systems have been developed for recovering the metal values in a commercially useful form.

Most of the reported methods for recovering metal elements from catalyst materials involve leaching with alkaline solutions. Fox et al., in U.S. Pat. No. 3,773,890, suggest roasting calcined catalyst with sodium chloride, which converts vanadium and molybdenum values to a water soluble form. After water leaching, the vanadium and molybdenum solution is separated and the residue is treated with an alkaline solution (such as sodium hydroxide) to dissolve aluminum. The aluminum-containing solution is separated, leaving a residue which contains cobalt and nickel in a concentrated form.

U.S. Pat. No. 4,075,277 to Castagna et al. is directed to the recovery of high purity molybdic acid from catalyst materials. The catalyst is impregnated with an aqueous solution of sodium carbonate and heated to convert molybdenum compounds into sodium molybdate, while avoiding substantial conversion of alumina into a water soluble compound. Molybdenum is then separated from alumina, cobalt and nickel by extraction with hot water.

In U.S. Pat. No. 4,087,510 to Steenken, the recovery of vanadium and molybdenum is accomplished by mixing catalyst with solid alkali metal carbonate, heating to convert sulfur, vanadium and molybdenum into water soluble compounds, and extracting the soluble materials with water.

Toida et al. teach a more complex separation scheme in U.S. Pat. No. 4,145,397, wherein molybdenum, vanadium, cobalt and nickel are recovered. Roasted catalyst is subjected to leaching with a hot caustic alkali solution, which solubilizes most of the vanadium, molybdenum and some of the aluminum. Insoluble residues are treated with a hot acid solution to dissolve most of the cobalt and nickel, some additional aluminum, and a small amount of remaining vanadium and molybdenum. In addition to requiring two types of leaching steps, the lack of specificity in leaching results in a highly complicated series of separations for each leach solution.

An example of metal extraction from catalysts using a salt solution is U.S. Pat. No. 3,567,433 to Gutnikov, in which a hot ammonium carbonate solution is used to dissolve molybdenum, vanadium and nickel. Only molybdenum is substantially completely solubilized by the procedure.

Acid solutions have not found significant use in catalyst metals recovery. Heretofore it has been considered desirable to avoid dissolution of aluminum, insofar as possible, because aluminum is a comparatively low-value component of the catalyst. Since the catalyst contains more aluminum than any other metal, a leach solution which contained proportions of valuable metals and aluminum similar to those of the catalyst would complicate subsequent separation. In addition, aluminum has commonly been considered a nuisance by-product which can be sold, but also requiring a recovery treatment which is quite expensive when compared to its market value.

Aluminum sulfate is, in fact, a highly marketable commodity, both in the form of its solid hydrate and as aqueous solutions, finding a significant use in water treatment and in the paper industry to facilitiate sizing. Solutions for these and other uses typically contain about 7.5 to about 8.5 percent by weight aluminum (calculated as $Al_2O_3$), are low in iron content, and contain approximately stoichiometric equivalents of aluminum and sulfate (i.e, a sulfate molarity 1.5 times the molarity of aluminum), with zero or only a slight excess of sulfuric acid permitted. The absence of excess sulfuric acid is also necessary if solid aluminum sulfate hydrate is to be produced by crystallization from the solution.

The commercial production of aluminum sulfate solutions is typically accomplished through the action of sulfuric acid on bauxite, a naturally occurring mineral which has the empirical formula $Al_2O_3.2H_2O$, but is probably a mixture of hydrous aluminum oxides and aluminum hydroxides. Less common substitutes for bauxite are materials such as clays and fly ash, i.e., ash produced by the burning of coal. These substitutes are generally economically unacceptable due to their lower aluminum content and the relatively greater difficulty of extraction over that of bauxite, so remain as potential sources of aluminum should the availability of bauxite become a problem.

An example of an aluminum sulfate production scheme is that of Skay in U.S. Pat. No. 3,079,228 wherein sulfuric acid and a substantial stoichiometric excess of bauxite is introduced into a heated ball mill, and allowed to react during particle grinding. The resulting aluminum sulfate solution is separated, and remaining solids are transferred to a reactor for digestion with a stoichiometric excess of sulfuric acid. Undigestible residues from the reactor are discarded, and the acidic aluminum sulfate solution is recycled to the ball mill for further reaction with bauxite. Disadvantages of the scheme include the multiplicity of process steps and the requirement for two separate time-consuming filtration separations.

Another process, which treats the more reactive forms of aluminum hydroxide, is described in U.S. Pat. No. 3,667,905 to Jennings. Sulfuric acid and the aluminum compound are introduced in stoichiometric proportions into a multi-pass, heat-exchanging reactor. The heat produced by the initial rapid reaction is utilized to promote later, slower reaction completion. To avoid an excess of sulfuric acid in the aluminum sulfate product (caused by incomplete reaction), one is advised to add excess aluminum feed, which necessitates a filtration step for the reactor product.

U.S. Pat. No. 3,393,975 to Mitchell et al. is directed to the production of aluminum sulfate from clays and fly ash, using a multiple-stage countercurrent leaching operation. In this operation, alumina-containing feed is introduced to the first in a series of vessels (e.g., four), and sulfuric acid is introduced to the last vessel. Liquid, comprising progressively weaker sulfuric acid and progressively stronger aluminum sulfate solution, is successively transferred to the preceding vessels of the series. At the same time, solids having a progressively lower aluminum content are successively transferred to later vessels of the series. Liquid which exits the first vessel is concentrated and a solid aluminum sulfate product is recovered by crystallization. In addition to requiring complex equipment, the process of Mitchell et al. suffers from the need for pumping large quantities of abrasive slurry through several operations, and from the slow product filtration step.

A need remains, however, for a treatment which is applicable to the less reactive forms of aluminum oxide, and which permits recovery of the valuable metal components from a spent catalyst while leaving a solution of aluminum sulfate which meets the applicable commercial specifications for a marketable commodity.

Accordingly, it is an object of the present invention to provide a method by which catalysts comprising transition metal compounds on aluminum oxide-containing supports can be treated to recover the various metals and also obtain a useful aluminum sulfate solution.

Another object is to provide a catalyst metal recovery treatment wherein the metals are dissolved in an uncomplicated device which permits close control of product acidity levels.

It is a further object to provide a treatment wherein the product from the dissolving operation contains, at most, a very small amount of insoluble solids, thus requiring little filtration.

A still further object is to treat catalyst materials to obtain a solution from which metals can be extracted to leave approximately stoichiometric equivalents of aluminum and sulfate to form $Al_2(SO_4)_3$.

These, and other objects and advantages of the invention, will become apparent from the following description and examples.

SUMMARY OF THE INVENTION

The invention is directed to a method for treating catalyst materials comprising transition metal compounds on aluminum oxide-containing supports, to produce compounds of the separated metals and a solution of aluminum sulfate.

As applied to spent hydrorefining catalysts from the hydrocarbon refining industry, the method comprises the following steps:

a. roasting the catalyst material in the presence of oxygen;

b. reacting the roasted catalyst with sulfuric acid, under conditions of countercurrent flow, to produce a solution comprising aluminum and other metals;

c. separating other metals from aluminum; and d. recovering a solution containing approximately stoichiometric equivalents of aluminum and sulfate to form $Al_2(SO_4)_3$.

Roasting is preferably conducted at the lowest temperature which will remove retained organic matter and sulfur compounds, but which is not so high as to significantly decrease the porosity of the catalyst material.

It is preferred to react the roasted catalyst and sulfuric acid in a countercurrent flow digester, which facilitiates close control over the pH of reaction product to obtain the desired acid utilization, and which also provides a product with a low undissolved solid content.

Separation of catalyst metals from the aluminum sulfate solution formed in the countercurrent flow digester can be accomplished by a number of chemical treatments, some of which are similar to those utilized in the recovery of metal compounds from ores. Especially preferred are the techniques of liquid-liquid extraction, permitting the sequential, selective removal of the various metals without the need for complex equipment or large quantities of expendable reagents.

DESCRIPTION OF THE INVENTION

This invention is concerned with the treatment of catalyst materials for recovery of valuable metals therefrom. More specifically, the treatment is designed for catalysts used in hydrocarbon refining processes, particularly hydrorefining processes.

Catalyst materials subjected to the treatment are usually in particulate form and should preferably contain aluminum oxide as a major component of the support. Although catalysts having supports containing silica-alumina composites, aluminosilicates, and the like, can be used in the practice of the invention, acid-insoluble substances tend to cause sludge formation in the digester, requiring appropriate vessel design and the installation of solid waste handling and disposal facilities. It is preferred, therefore, to utilize catalyst having alumina supports which are essentially completely dissolved in the method of the invention.

A typical spent cobalt-molybdenum residuum hydrodesulfurization catalyst treated in accordance with the method of this invention has the following approximate weight percentage composition: 1 to 4 percent cobalt, 0.5 to 4 percent nickel, 6 to 12 percent molybdenum, 1 to 20 percent vanadium, 5 to 25 percent carbonaceous and hydrocarbon materials, 1 percent undesirable inorganic contaminants (e g., compounds of iron, lead and other trace metals), and 5 to 8 percent sulfur, with the balance mainly aluminum oxide. The exact composition of a catalyst, of course, is dictated by the nature of the reactor it is used in and, for spent catalysts, the nature of the hydrocarbon feedstock which has been in contact with the catalyst. Spent nickel-molybdenum catalysts will normally contain no cobalt and will have smaller amounts of vanadium, since they are primarily used for petroleum distillates, which are relatively much less contaminated with nickel and vanadium than are residua.

Other components, such as tungsten, are present in some catalysts (e.g., nickel-tungsten catalysts for hydrogenating petroleum feeds containing nitrogen), and the invention can be used to treat such materials.

Figure 1:
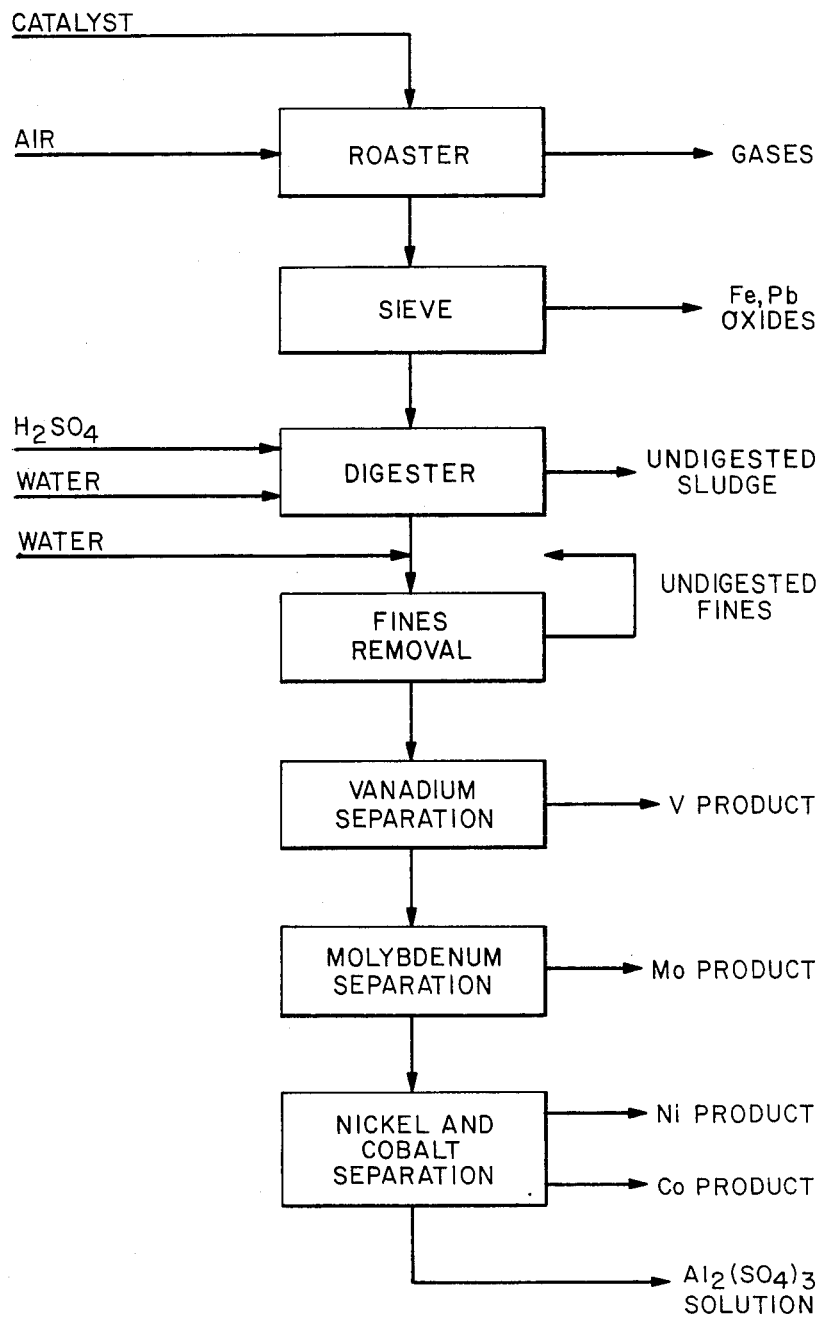
FIG. 1 is a simplified diagram showing the relationships of the various operations used in a preferred embodiment of the present invention.

The method of the invention is portrayed in FIG. 1, which shows the sequence of operations in a typical embodiment for treating a spent cobalt-molybdenum residuum hydrodesulfurization catalyst having an alumina support. Referring to the Figure, particulate catalyst is roasted in air, passed over a screen, and digested in sulfuric acid, after which the digestion product is subjected to a fines removal step. Following this, various separation techniques are used to produce vanadium, molybdenum, nickel and cobalt products, leaving a solution of aluminum sulfate. Each operation will be explained in greater detail in the following paragraphs.

As previously noted, hydrorefining catalysts are utilized in a sulfide form. In addition, a spent catalyst being removed from service has a substantial amount of carbonaceous deposits, as well as oils trapped inside the porous structure of the support. Removal of these materials is accomplished by roasting in the presence of oxygen. Carbonaceous matter and oils are burned and sulfur compounds are converted to sulfates and oxides during the roasting, giving off gaseous reaction products which include oxides of carbon and sulfur.

Roasting can be performed in various types of equipment, such as fluidized bed combustion units, conventional kilns, and the like, but is preferably conducted in a rotary calciner to facilitate temperature control. A temperature of at least about 400° C. is usually necessary to remove sulfides and oils, but close control of the temperature is difficult due to the rapid heat evolution encountered when oxidation reactions begin on the catalyst particles. It is desirable to maintain the lowest possible temperature which will achieve a predetermined sulfur and carbon level, because the porosity of catalyst particles (as measured by surface area) decreases upon exposure to elevated temperatures, causing a corresponding increase in reaction time during later digestion operations of the invention method. It has now been discovered that roasted catalyst digestion time is approximately inversely proportional to the square of the measured particle surface area, clearly pointing out the importance of close control over roasting temperatures.

Temperature control is achieved in rotary calciners most readily by the passage over the particles of sufficient gas to remove the required amount of heat. Typically the gas used is air, which serves both as a coolant and as the source of oxygen for the roasting reactions. Cooling air must be used judiciously, however, since pollutants (such as sulfur oxides) are formed during roasting, and are more difficult and expensive to recover when highly diluted by other gases.

In general, the roasting temperature should not exceed about 900° C., and is preferably much lower, e.g., below about 650° C. to retain sufficient catalyst porosity for subsequent digestion at a reasonably rapid rate.

Many spent catalysts, particularly those which have been used to treat residua, contain trace metal contaminants such as iron and lead. These elements become troublesome in the process, because iron carries through all the separation stages and remains a contaminant in the final aluminum sulfate solution. Lead is a lesser problem, since it will precipitate as lead sulfate in the digester. However, if excessive lead is present, considerable sludge will be formed in the digester, creating an inconvenient sludge removal and disposal requirement.

Much of the contaminants has been found to be located on the surface of the roasted catalyst particles, as a "rind," and removable to a large extent by abrading the particles. This can be accomplished by passing the catalyst over a vibrating sieve which has a mesh size somewhat smaller than the catalyst particles. Contaminants will be reduced by the abrasive action of the screening and can be collected for disposal.

Figure 2:
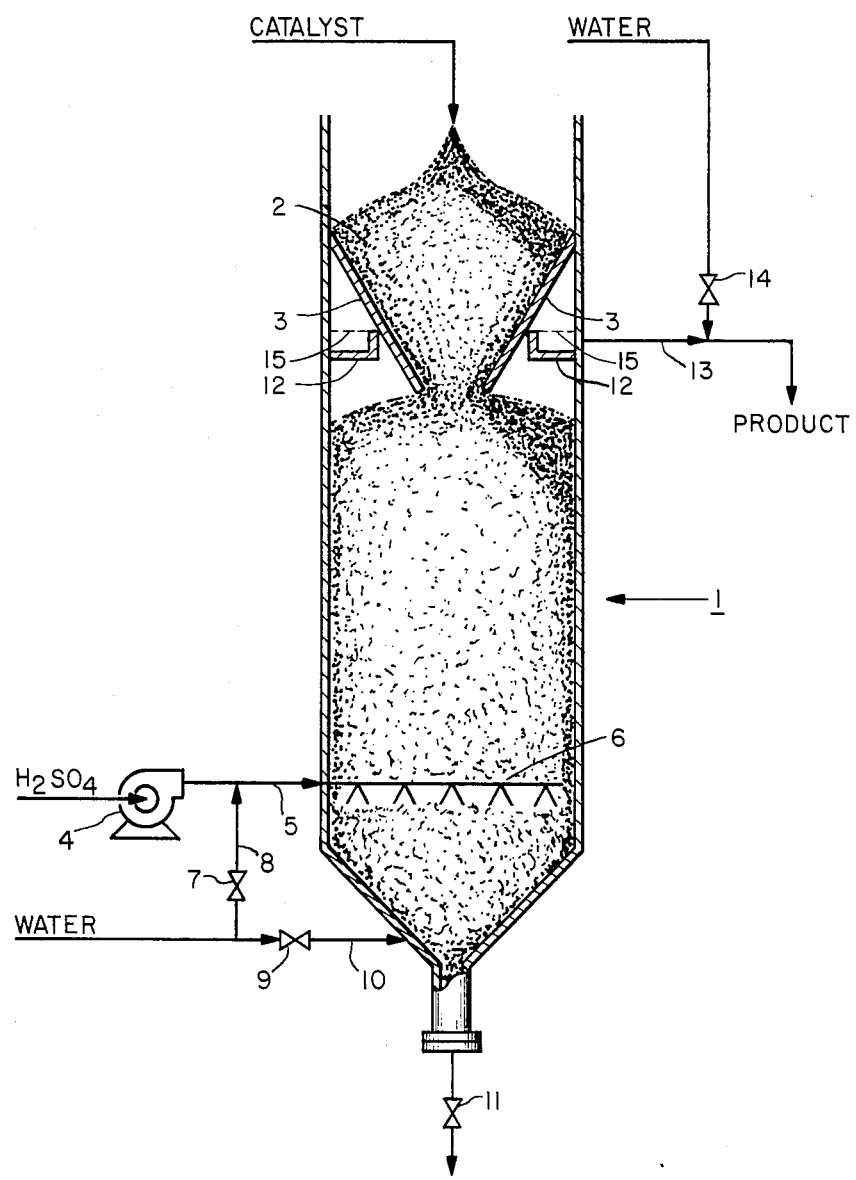
FIG. 2 is a schematic diagram of a countercurrent flow reactor which can be used for digesting catalyst materials in the practice of the invention.

Roasted and screened catalyst is charged to a digester, where it is reacted with sulfuric acid. Referring now to FIG. 2, a preferred digester vessel embodiment 1 is vertically positioned and preferably has a generally cylindrical shape, terminated at its lower end by a conic section. Catalyst is fed into the top of the digester so as to maintain a quantity of the dry material 2 above the digester liquid level. Sulfuric acid is passed through pump 4, diluted as necessary by a flow of water through conduit 8 controlled by valve 7, and fed to distributor 6 through conduit 5. The distributor can take the form of a hollow ring located near the bottom of the digester, above or within the conic section, and provided with openings to direct the flow of sulfuric acid downward. Valve 11 is provided for removing sludge, such as insoluble lead sulfate, siliceous material present in the catalyst, residual carbon, and the like, whenever the sludge has built up to a predetermined extent. Alternatively, sludge build-up can be prevented or inhibited by a slow, continuous flow through this valve. Sludge is normally discarded.

Liquid level in the digester is established by the location of a product overflow collector 12 in the upper portion of the vessel. This collector can take the form of a channel fastened around the inner circumference of the vessel, and is provided with an outlet opening for removal of the product from the digester. Liquid rises in the vessel until it overflows the edge of the collector, and is conducted from the collector through the outlet opening. Means, such as conical baffle 3, are provided to prevent dry catalyst particles from entering the collector. Liquid product flows from the digester through conduit 13, and dilution water can be added to the liquid product as desired through flow controller 14.

Alternatively, to facilitate starting up the filled digester after a shutdown period, only concentrated acid is fed to distributor 6, and diluent water can be added separately near the bottom of the digester using valve 9 and conduit 10. In this embodiment, a shutdown would be accomplished by first ceasing acid flow and maintaining water flow until only very dilute acid remains in contact with partially dissolved catalyst, which will prevent the agglomeration of partially dissolved catalyst particles.

In addition to the previously mentioned use of baffles, particles can be excluded from the product collector by a liquid permeable barrier 15, such as a screen or filtration fabric. It is important, however, that the liquid flow is not unduly impeded by the barrier, to prevent overfilling of the digester vessel and subsequent spillages. The barrier will normally take the form of a cover over the overflow collector, and can be used with or without other means, such as baffles.

The use of a countercurrent flow digester as described has considerable advantages in achieving the objects of this invention. One advantage is the ability to maintain close control over digester product acidity, which is attained by altering the acid and water flow rate. This function can be performed automatically by using a valve in the acid feed conduit which is controlled by a monitoring means measuring pH in the digester product stream. A further advantage is the ability of the digester to produce a product having a very low undissolved solids content, due to the fact that smaller particles of undissolved catalyst are found primarily toward the bottom of the vessel, and the bed of larger particles in the uppermost area of the digester acts as a filtration medium for liquid which rises through it.

As noted previously, some users of aluminum sulfate solutions require that the excess sulfuric acid present in the product be kept at a very low level. This condition, corresponding to the stoichiometric reaction of sulfuric acid and pure alumina, will yield a solution pH of about 2.0 for the concentrated product contemplated by the invention. However, a catalyst material also contains other metal compounds which will consume acid during digestion, and later solvent extraction separation procedures with organic acids will result in a lowered pH product, due to the displacement of organic acid protons by extracted metal ions. It is therefore necessary to obtain a digester product which has a pH somewhat higher than 2.0, to compensate for protons which will be added during subsequent extractions.

Due to the highly buffered nature of strong aluminum sulfate solutions, it is not feasible to predict a proper digester product pH which should be maintained with a specific catalyst material. In general, however, a higher pH is required for higher levels of cobalt, nickel and vanadium, since these elements are generally extracted using organic acids. It has been found that the spent residuum hydrorefining catalyst materials should yield digester solutions having a pH in the range of about 2.5 to about 3.2, depending upon the amount of extractable metals present, for final aluminum sulfate solutions with acceptable amounts of excess acid. At such pH values, molybdenum exists primarily as an anionic species, and therefore does not require extraction with acid reagents.

Unfortunately, a significant increase in residence time usually is required to obtain an increased digester product pH. For a typical spent residuum catalyst, producing a pH 2 solution requires only about 70 percent of the digester residence time needed to obtain a solution of pH 3. It is readily apparent that less residence time will be used in cases where the user of the aluminum sulfate product does not require the absence of excess acid.

Sulfuric acid which is fed to the digester can have a concentration of about 10 to about 60 percent by weight. Since the rate of reaction with catalyst particles increases as the acid strength increases, higher concentrations are generally preferred. Especially preferred are acid concentrations in the range of about 20 to about 50 percent by weight. The aluminum sulfate solution product which is formed by acids below about 28 percent by weight requires concentration (such as by evaporation) to meet the usual commercial specifications, while that from acids of significantly higher concentrations will require dilution to prevent precipitation at normal storage temperatures.

Digestion proceeds more rapidly at increased temperatures, up to the boiling point of the solution. A convenient source of heat is the highly exothermic reaction resulting from the dilution of sulfuric acid with water. Dilution of, for example, 93 to 95 percent by weight acid to obtain a concentration of about 40 percent by weight raises the acid temperature nearly to its boiling point of 114° C. Insulating the digester is of some assistance in maintaining an elevated temperature of its contents, but additional heat input through, for example, internal or external heat exchangers can be used to accelerate the digestion. A temperature of at least about 80° C. is preferred for the digestion, but it is also preferred to keep the temperature somewhat below the solution boiling point, thereby avoiding the agitation effect of boiling which tends to mix finely divided particles into the upper areas of the digester.

Catalysts containing more than about 2 percent by weight of vanadium normally also require the addition of reducing agents to the digester to prevent precipitate formation, for example, precipitation of insoluble aluminum vanadate. Formaldehyde is an acceptable reducing agent, since it effectively reduces the oxidation state of vanadium and iron, while having a minimal effect on molybdenum. Other useful reducing agents for this purpose include glyoxal, sulfur dioxide, sugars and ethylene glycol. Reducing agent should be added toward the bottom of the digester, separately or blended with the sulfuric acid stream, in an amount approximately equal to the calculated concentration for quantitative reduction of the vanadium present.

The liquid product from the digester is diluted with water as required to prevent precipitation upon cooling, and is transferred to a facility for the removal of fine particulate matter. This stage typically comprises an unstirred holding vessel for cooling the solution and settling particles, plus a filtration means to separate any remaining small amount of insolubles which do not settle out. Particulate matter can be either recycled to the digester or discarded.

The amount of undissolved particulate matter which is present in the digester product is dependent upon the nature of the catalyst material which has been initially fed to the digester and also upon the manner of operating the digester. Typically, these particles comprise less than about 2 percent by weight of the digester product. Fairly complete removal of particulates is advisable prior to any solvent extraction operations, due to the tendency of stable emulsions to form when particulate-containing aqueous solutions are contacted with some organic liquids.

Separation of metal values from the substantially clarified liquid is preferably accomplished using liquid-liquid extraction techniques with the mixer-settler equipment commonly used in the minerals processing industry. Such "solvent extraction" has several advantageous properties, including relative simplicity over other chemical processing, a generally low reagent consumption, and an ability to easily compensate for varying feed material compositions. A summary of several processes for separating vanadium from uranium and other metals in process streams is given by G. M. Ritcey and A. W. Ashbrook in *Solvent Extraction: Principles and Applications to Process Metallurgy, Part II*, Elsevier Scientific Publishing Company, New York (1979), at pages 524–532. This work also discusses molybdenum extraction at pages 269–278 and deals with nickel and cobalt extraction separations at pages 280–361.

Useful methods for separating individual components of the digester product are described in the following sections.

A. Vanadium Recovery

Vanadium in the pentavalent state is extractable by many reagents having an amine functional group, but the reduced (tetravalent) vanadium, which is preferred in the digester to prevent precipitate formation, is extracted to a much lesser extent by amines. Tetravalent vanadium is extracted by various reagents containing phosphorus, such as alkyl phosphoric acids.

Since reduction of vanadium is accomplished in the digester, it is preferred to maintain this reduced state through the vanadium separation stage. This facilitates a more efficient recovery of vanadium in one operation, but requires that air and other oxidants be excluded from contact with digester product until the vanadium recovery is complete. Such exclusion can be accomplished by blanketing the digester, holding vessel, filtration means and vanadium solvent extraction equipment with an inert gas, such as nitrogen, argon, carbon dioxide and the like.

The requirement for exclusion of oxidants until vanadium has been recovered strongly influences the choice of order in which components will be separated. If maintenance of a reduced vanadium species was not required, either vanadium or molybdenum could be extracted first. However, since it would not necessarily be desirable to provide an inert atmosphere additionally in the molybdenum extraction circuit, vanadium will normally be extracted before molybdenum.

Bis(2-ethylhexyl)phosphoric acid, hereinafter referred to as "DEHPA," is a preferred extractant for tetravalent vanadium in solution. DEHPA is normally diluted with a water-immiscible inert hydrocarbon solvent material, such as kerosene, for use. Unfortunately, this extractant also is quite effective in removing aluminum from sulfate solutions at the pH range contemplated for this invention (see the previously noted book by Ritcey and Ashbrook, page 170). The use of a mixture of extractants has a beneficial effect on overall selectivity of the system for vanadium removal; an extractant containing about 150 grams per liter DEHPA and about 100 grams per liter dibutyl butyl phosphonate (hereinafter "DBBP") in kerosene or a similar diluent has been found to be particularly suitable, both from the standpoint of specificity for vanadium and the high loading capacity obtained. In addition to DBBP, useful extractant "modifiers" include tributyl phosphate, tri-n-octylphosphine oxide, and similar materials.

The DEHPA-DBBP system also extracts molybdenum, but the extraction of vanadium predominates from feed solutions which contain more than about 3 grams per liter tetravalent vanadium. In addition, ferric iron is extractable by the system, but under the preferred oxidant-free method of operation, little iron in the ferric state should be present in digester product.

A typical circuit for vanadium extraction comprises an extraction section of four mixer-settler cells, wherein digester product is contacted with barren organic extractant. The aqueous effluent ("raffinate") from the extraction cells is removed for later processing to recover other constituents. Vanadium-containing "loaded" organic is passed to a four-cell strip section, in which a 10 percent by volume sulfuric acid solution removes vanadium for recovery by conventional means, e.g., precipitation as "red cake" (sodium hexavanadate) by sodium chlorate treatment of the solution, followed by calcining of the precipitate to form vanadium pentoxide.

Organic removed from the strip section can be contacted with a 50 percent by volume sulfuric acid solution to scrub aluminum and iron from the extractant. The aqueous effluent can be returned to the digester vessel and utilized for dissolving catalyst feed. The scrubbed organic is then transferred to a molybdenum strip section, from which it can be recycled as barren organic extractant.

Molybdenum stripping can be accomplished in four cells, using water, or can be done in two cells, using an ammonium hydroxide-ammonium carbonate solution. The resulting molybdenum solution will contain some vanadium and can be combined with digester product which is fed to the vanadium extraction circuit.

B. Molybdenum Recovery

Various amine compounds and quaternary ammonium salts are useful for the extraction of molybdenum from aqueous solutions. One extractant which has found commercial application is known by the trade name Alamine 336, a tertiary amine produced by Henkel Corporation. Modifiers, such as long chain alcohols and phosphorus-based compounds, are used in conjunction with amines to improve solubility of the extracted molybdenum complex in the organic diluent for the extractant. Tri-n-butyl phosphate, DEHPA and dibutyl butyl phosphonate (or mixtures thereof) have been found to exhibit excellent performance when used with Alamine 336 for the extraction of molybdenum in the system contemplated herein.

Alamine 336 extracts anionic species, which includes molybdate ion and polymeric molybdate ions existing in molybdenum solutions which are above a pH of about 2. Upon standing, these solutions typically form polymolybdates, such as the anion $(H_2Mo_8O_{26})^{-2}$. Such polymers will be very efficiently extracted, since each molecule of amine will coordinate with more molybdenum than if a simple molybdate were present, but are nevertheless undesirable due to the excessive viscosity which they can cause in loaded extractant.

Using a solvent comprising about 75 grams per liter Alamine 336 and about 50 grams per liter dibutyl butyl phosphonate in kerosene, molybdenum in the vanadium extraction raftinate can be efficiently extracted with four mixer-settler cells and the aqueous raffinate from these cells utilized in a subsequent cobalt/nickel recovery system.

Pentavalent and tetravalent vanadium is also extracted in the molybdenum circuit, emphasizing the importance of maximizing extraction efficiency in the vanadium system. If vanadium impurity in the ultimate molybdenum product must be as low as is possible to obtain, it will be necessary to maintain an inert (nonoxidizing) atmosphere in the molybdenum circuit. By keeping the vanadium in its reduced (tetravalent) state, scrubbing the loaded molybdenum circuit extractant with an acid solution, e.g., 10 to 15 percent by volume sulfuric acid, will remove vanadium contaminant.

Alternatively, a reasonably efficient removal of tetra and pentavalent vanadium can be obtained from molybdenum-loaded organic without maintaining an inert atmosphere, if additional complexity in the molybdenum circuit can be tolerated. This is accomplished by stripping the molybdenum and vanadium (plus some aluminum and all of the iron) through contact of the loaded organic with dilute sodium hydroxide solution at a pH of about 10 to 12, acidifying the aqueous phase to a pH of about 0.5 using dilute sulfuric acid, and re-extracting the molybdenum with the original organic extractant. An improved vanadium separation can be obtained by adding a reducing agent, such as sodium sulfite or hydrazine, to the alkaline solution, prior to acidification.

Following vanadium removal by either of these techniques (scrubbing or re-extraction), loaded organic is washed with water, typically in only one mixer-settler cell, and molybdenum is stripped with ammonium hydroxide solution in two or three cells. The formed ammonium molybdate can be crystallized as a marketable product.

Organic extractant from the stripping stage is regenerated by contact with sulfuric acid solution (e.g., 10 percent by volume) and can be recycled as barren solvent for this circuit.

Presently, the most preferred molybdenum extraction system utilizes an inert atmosphere for maintaining tetravalent vanadium, an extractant comprising equimolar Alamine 336 and DEHPA (e.g., about 0.2 molar) with 50 grams per liter DBBP, in a kerosene solution, and configured with the previously described re-extraction technique.

Tungsten, if present in the catalyst solution obtained from the digester, will be co-extracted with molybdenum by Alamine 336. When the loaded solvent is stripped with ammonium hydroxide solution, ammonium tungstate will precipitate, permitting recovery by filtration prior to crystallizing the ammonium molybdate. References for this separation are found in the previously noted book by Ritcey and Ashbrook, at pages 447-451.

C. Cobalt and Nickel Recovery

Due to the similarities in the chemistry of both cobalt and nickel, their separation has historically been difficult to obtain from sulfuric acid solutions below about pH 4 to 5. Solvent extraction techniques have been applied to this separation problem, generally yielding reasonably pure products from both acidic and alkaline feed solutions.

In addition to process schemes described by Ritcey and Ashbrook, previously cited, United Kingdom Pat. No. 1,550,964 reports the extraction of cobalt and nickel by a mixture of an organophosphate compound and a dithiophosphoric acid diester, the extraction being possible from a slightly acidic solution and subsequent stripping being accomplished using strong aqueous acids. It has been discovered, however that the use of strong acid in contact with dialkyldithiophosphoric acids causes a rapid degeneration of the extraction capacity of the extractant.

A useful system for cobalt and nickel removal from molybdenum circuit raffinate includes the extraction of both cobalt and nickel using a dialkyl dithiophosphoric acid (having alkyl groups which preferably each contain from about 6 to about 12 carbon atoms) in a suitable organic diluent, such as kerosene. Raffinate from this extraction, comprising aluminum and sulfate ions in aqueous solution, can be transferred to an aluminum sulfate product recovery operation, for dilution, concentration, crystallization or other steps to prepare a marketable product.

Loaded organic can be treated with an oxidant, or simply contacted with air (such as by sparging), to oxidize cobalt to the trivalent state; this oxidation has been found to proceed very readily when cobalt is complexed with the dithiophosphate extractant. Both cobalt and nickel can be stripped using a salt of an ion which will displace these metals, such as sodium, ammonium, calcium and magnesium. Ammonium sulfate has been found suitable for this purpose, particularly an alkaline solution (for example, pH 9) having a concentration of about 3 to about 5 molar in water.

Nickel is separated from the ammonium sulfate solution by extraction with a suitable extractant, such as a solution of LIX64N (Henkel Corporation) in a kerosene diluent. LIX 64N is a mixture of 2-hydroxy-5-nonyl benzophenone oxime (LIX 65N) and a small amount of an "extraction catalyst," 5-8-diethyl-7-hydroxy-6-dodecanone oxime (LIX 63). This reagent is quite selective, extracting nickel but not trivalent cobalt. Following stripping of the nickel with a dilute acid, preferably sulfuric acid, the organic can be recycled for further nickel extractions, while the aqueous solution can be treated for nickel recovery, such as by precipitation with sodium carbonate, crystallization of nickel sulfate, electrodeposition and other methods.

After nickel removal, the ammonium sulfate solution can be treated for cobalt recovery and then recycled for use in cobalt-nickel stripping. Cobalt recovery is readily accomplished by a number of methods, including a simple hydrogen reduction to cobalt metal in an autoclave.

Another system which can be utilized for the recovery of cobalt and nickel from molybdenum circuit raffinate begins with an initial separation by precipitation of cobalt and nickel sulfides, using hydrogen sulfide, water soluble sulfides such as sodium sulfide and/or, more preferably for easily filterable particles, with a water soluble polysulfide such as sodium polysulfide. Complete precipitation is accomplished in a vessel wherein a positive pressure of hydrogen sulfide is maintained or, if sodium sulfide or polysulfide is used, following pH adjustment to a level from about 3.0 to about 3.4. After separation of the precipitated sulfides by filtration or centrifugation, the aluminum sulfate stream can be treated, as described previously in this section, to prepare a marketable product.

Separated sulfide solids are roasted in air to form oxides of cobalt and nickel, preferably utilizing a temperature above about 850° C. to favor formation of cobaltous oxide. A rapid cooling, preferably in a non-oxidizing atmosphere, will assist in preventing the transition to cobaltosic oxide, $Co_3O_4$, which forms by absorption of oxygen during cooling.

The mixed oxides can be dissolved in aqueous acid, such as hydrochloric acid having a concentration more than about 5 molar, preferably using an appropriate amount such that the final cobalt concentration in solution will be approximately 0.5 Molar. Any $Co_3O_4$ present will dissolve quite slowly, even in acid which has been heated to its boiling point. The resulting aqueous acid solution can be treated by solvent extraction to remove either cobalt or nickel; the remaining component can then be recovered by precipitation, electrodeposition or other techniques in a reasonably pure form.

Since some iron contamination is normally present in the cobalt and nickel sulfide precipitate, and dissolves in hydrochloric acid, extraction of iron is advisable prior to product separations. Various extractants can be used for this purpose, including amines, ketones, ethers, alkyl phosphates and others. Reference is made to the aforementioned book by Ritcey and Ashbrook, at pages 253-261, for examples of iron extraction procedures.

Cobalt is extractable from a hydrochloric acid solution quite readily by a number of compounds containing amine functional groups, such as Alamine 304 or 336, tri-iso-octyl amine and others. To enhance the solubility of extracted cobalt complexes in the organic diluent, various "modifiers" are used, including aliphatic alcohols such as tridecanol.

Stripping of cobalt from the loaded organic is accomplished using water, preferably in such quantities that the chloride concentration does not exceed about 2 Molar and the cobalt concentration is less than about 0.5 Molar. Final recovery of cobalt from the strip solution can be accomplished by precipitation using sodium carbonate (or bicarbonate), electrodeposition, and the like.

The invention is further illustrated by the following examples, which are illustrative of various aspects of the invention and are not intended as limiting the scope of the invention as defined by the appended claims. In the examples, all percentages are expressed on a weight basis. Metal analyses reported as oxides assume the following compositions: $V_2O_5$, $MoO_3$, $CoO$, $NiO$, and $Al_2O_3$.

EXAMPLE 1

This example demonstrates the roasting and dissolving of spent catalyst, in one embodiment of the invention.

A spent catalyst, which has been used in the hydrodesulfurization of residual oil, is roasted under conditions of forced air flow to remove oil, carbon and sulfur residues. In the furnace, the temperature is raised to about 1,200° F. over a period of several hours and maintained at that level for about four hours.

Cooled, roasted catalyst is fed to a laboratory counter-current digester, as shown in FIG. 2, and dissolved in 20 percent sulfuric acid solution, maintained at its boiling temperature, using an acid residence time of about 103 minutes. Sucrose is added to the digester to maintain dissolved vanadium in the reduced (tetravalent) state. During the digestion, the product solution pH varies from about 2.94 to about 3.02.

Analyses of the roasted catalyst and digester product are as shown in Table I.

TABLE I

|  | Metal Content | | | | |
| --- | --- | --- | --- | --- | --- |
|  | V | Mo | Co | Ni | Al |
| Catalyst (percent, as oxide) | 12.9 | 10.2 | 3.26 | 2.62 | — |
| Product (grams per liter) | 11.2 | 9.0 | 3.0 | 2.1 | 34.9 |

EXAMPLE 2

The effect of acid residence time variations upon average digester product pH is studied using the same catalyst, acid and digester as in the preceding example, while varying acid flow rates. Results are in Table II.

TABLE II

| Acid Residence, minutes | Solution pH |
| --- | --- |
| 103 | 2.98 |
| 73 | 2.87 |
| 52 | 2.77 |
| 40 | 1.04 |

EXAMPLE 3

To show the effect on digestion of increased acid strength, the experiment of Example 1 is repeated using 40 percent sulfuric acid and an acid residence time of 38 minutes. The digester product has a pH of about 2.68 and contains the following concentrations of metals, expressed in grams per liter: 18.3 Al, 1.5 Co, 4.4 Mo, 1.0 Ni, and 5.9 V.

EXAMPLE 4

Vanadium extraction parameters are studied, using a catalyst digest solution containing the following concentrations of metals (in grams per liter): 31.0 Al, 2.25 Co, 2.75 Mo, 3.12 Ni, and 12.9 V. The solution is adjusted to a pH of about 2.7 with sodium hydroxide solution, heated to boiling, and given additions of sodium sulfite to reduce vanadium to the tetravalent state.

The aqueous solution is placed into a 125 ml separatory funnel, containing an organic extractant composed of 100 grams per liter DEPHA and 75 grams per liter DBBP in kerosene. Contents of the funnel are stirred for two minutes, using a motor driven impeller, and the phases are allowed to separate. Analyses are performed after filtering the aqueous material through filter paper and the organic material through phase separating filter paper.

Results of the extractions are as shown in Table III. It should be noted that the extractions are performed in air, resulting in partial oxidation of the vanadium which reduces the fraction passing into the organic phase.

TABLE III

| Volume, ml | | Vanadium, g/l | | Organic Contaminants | |
|---|---|---|---|---|---|
| Aqueous | Organic | Aqueous | Organic | Al, mg/l | Mo, g/l |
| 50 | 10 | 5.6 | 1.2 | 14 | 0.16 |
| 40 | 20 | 5.2 | 3.1 | 32 | 0.52 |
| 30 | 30 | 6.6 | 4.6 | 48 | 0.16 |
| 20 | 40 | 7.8 | 4.6 | 76 | 1.24 |
| 10 | 50 | 9.4 | 6.9 | 96 | 1.40 |

EXAMPLE 5

The stripping of vanadium from an organic extractant is studied. Extractant containing 100 grams per liter DEHPA and 75 grams per liter DBBP in kerosene diluent is loaded to a vanadium concentration of 4.5 grams per liter by contact with a catalyst digest solution. The organic phase is separated and used for stripping tests, in which 10 percent sulfuric acid and loaded extractant are stirred in separatory funnels for two minutes. After phase separation, the components are filtered (as in the preceding example) and analyzed. Results are shown in Table IV.

TABLE IV

| Volume, ml | | Vanadium, g/l | |
|---|---|---|---|
| Aqueous | Organic | Aqueous | Organic |
| 100 | 10 | 16.2 | 4.3 |
| 20 | 20 | 3.85 | 1.0 |
| 20 | 40 | 2.35 | 0.76 |

EXAMPLE 6

Molybdenum extraction is shown using a catalyst digest solution of pH 3.0 which contains the following metal concentrations, in grams per liter: 34.2 Al, 7.9 Mo, and 8.2 V. The solution is mixed with an extractant containing 75 grams per liter Alamine 336 and 50 grams per liter DBBP in kerosene, using the general procedure of Example 4. Results are obtained as in Table V.

TABLE V

| Volume, ml | | Molybdenum, g/l | | Organic Contaminants | |
|---|---|---|---|---|---|
| Aqueous | Organic | Aqueous | Organic | Al, mg/l | V, g/l |
| 50 | 10 | <0.01 | 2.0 | 10 | 0.3 |
| 40 | 20 | <0.01 | 5.4 | 30 | 1.0 |
| 30 | 30 | <0.01 | 7.2 | 33 | 1.6 |
| 20 | 40 | 0.029 | 14.9 | 49 | 2.1 |
| 10 | 50 | 1.02 | 23.6 | 15 | 4.0 |

EXAMPLE 7

An organic extractant as shown in the preceding example is contacted with a molybdenum-containing solution and, after separation therefrom, contains 0.75 grams per liter Al and 18.0 grams per liter Mo. This loaded organic is stripped with 4 normal ammonium hydroxide solution, in the ratio of 100 ml organic to 10 ml aqueous, for two minutes and the phases are filtered as in Example 5. Upon analysis, the organic material is found to contain less than 10 mg/l Mo; the aqueous solution contains 72 g/l Mo and less than 10 mg/l Al, indicating a very effective stripping.

EXAMPLE 8

The improvement in extraction selectivity for molybdenum, which is obtained by adding DEHPA to an Alamine 336-DBBP extractant is demonstrated using a catalyst digest solution having a pH of 3.3 and containing the following metal concentrations (in grams per liter): 51.4 Al, 11.0 Mo, and 1.1 V. The extractant contains 84 grams per liter Alaimine 336 and 50 grams per liter DBBP in kerosene (identified hereinafter as "A 336"); a modified extractant (identified as "A 336-D") further contains 67 grams per liter DEHPA.

Sequential batch operations are performed with each extractant, using volume ratios of organic to aqueous ("O/A Ratio") which simulate, in one step, procedures which would require multiple stages in a continuous operation. Following extraction of molybdenum from the digest solution, the organic phase is scrubbed with 10 percent by volume sulfuric acid and stripped with 5 percent sodium hydroxide. After acidifying the sodium hydroxide, the original stripped extractant is used to re-extract molybdenum. A 6 molar ammonium hydroxide solution is used for the final stripping of molybdenum product.

Results follow in Table VI.

TABLE VI

| Operation | O/A Ratio | Phase Analyzed | Al, g/l | | Mo, g/l | | V, g/l | |
|---|---|---|---|---|---|---|---|---|
| | | | A336 | A336-D | A336 | A336-D | A336 | A336-D |
| Extraction | 1 | Organic | 0.22 | 1.3 | 15.5 | 16.3 | 1.0 | 0.91 |
| Scrub | 4.5 | Organic | 0.21 | 0.16 | 17.6 | 15.1 | 0.91 | 0.67 |
| Strip | 2 | Aqueous | 0.36 | 0.22 | 31.7 | 26.9 | 2.1 | 1.3 |
| Re-extract | 2 | Organic | <0.01 | <0.01 | 18.3 | 17.6 | 0.49 | 0.23 |
| Final Strip | 5 | Aqueous | <0.01 | <0.01 | 72.9 | 76.1 | 2.57 | 1.26 |

EXAMPLE 9

The dithiophosphate extraction separation of nickel is shown, using an extractant prepared from a commercially available zinc dialkyldithiophosphate, having alkyl groups with 10–12 carbon atoms. The compound is contacted with 6 molar hydrochloric acid to remove zinc, then is used to prepare an extractant which is 0.2 molar dithiophosphate and 0.2 molar DBBP in kerosene.

A solution containing 0.1 molar nickel sulfate and 0.5 molar aluminum sulfate, having a pH of 3.0, is mixed with an equal volume of the above-described extractant for five minutes. After phase separation, the loaded organic is found to contain 5.14 grams per liter nickel.

Loaded organic is contacted for five minutes with an equal volume of stripping solution (4 molar ammonium sulfate, adjusted to pH 9.0 with ammonium hydroxide). After phase separation, the organic contains 1.90 grams per liter nickel, indicating a stripping of 63 percent of the original nickel loaded into the extractant.

EXAMPLE 10

The effect of stripping solution choice upon stability of a dithiophosphate extractant is shown by repeatedly mixing extractant with fresh portions of an aqueous nickel solution to load the maximum amount of nickel, continuously stirring the loaded extractant with an equal volume of stripping solution in a closed vessel at 40° C. for a predetermined time interval, allowing the phases to separate, and determining the maximum nickel loading capacity of the extractant.

Results as shown in Table VII are obtained using 6 normal hydrochloric acid and 4 normal ammonium sulfate (adjusted to pH 9.0) as stripping solutions.

TABLE VII

| Stripping | Nickel Capacity, g/l | |
|---|---|---|
| Time | HCl Strip | $(NH_4)_2SO_4$ Strip |
| 1 hour | 2.5 | 5.9 |
| 1 week | 0.04 | 4.7 |
| 4 weeks | 0 | 4.5 |

The phosphorus content of the hydrochloric acid stripping solution is increased to 2.74 grams per liter during a four week period of contact with extractant, but the ammonium sulfate solution phosphorus content remains undetectable. This indicates that dithiophosphates are not rapidly decomposed by solutions of ammonium sulfate.

EXAMPLE 11

The effect of air oxidation on cobalt extraction and stripping with dithiophosphates is shown, using an extractant prepared as in Example 9, a cobalt solution containing 0.1 molar cobaltous sulfate, 0.5 molar aluminum sulfate, plus sufficient sulfuric acid to establish a pH of 3.0, and a stripping soluton of 4 molar ammonium sulfate adjusted to pH 9.25.

Extractant is contacted twice with equal volumes of fresh cobalt solution under an argon atmosphere, to obtain maximum loading of cobalt. Loaded extractant is stripped with an equal volume of stripping solution, under either air or an argon atmosphere. Re-extraction of cobalt solution is then conducted under the same atmosphere as was used for stripping. Results obtained from stripping and re-extraction with an extractant initially containing 4.98 grams per liter cobalt are as shown in Table VIII.

TABLE VIII

| | Cobalt in Organic, g/l | |
|---|---|---|
| Operation | Argon | Air |
| Stripping | 2.41 | 2.57 |
| Re-extraction | 4.73 | 3.40 |

Since 95 percent of the original extraction capacity remains after stripping under argon, apparently the cobaltous species is present during re-extraction. The 32 percent loss of capacity in the air system is consistent with extraction of cobaltic species, which requires three ligands as compared to the two ligands utilized by cobaltous.

EXAMPLE 12

Sulfide precipitation of cobalt and nickel is accomplished from a catalyst digest solution of pH 3.15, containing 1.99 grams per liter cobalt and 60 milligrams per liter nickel. A 200 milliliter sample of the solution is placed in a stirred autoclave with 5 grams of 50 percent sodium polysulfide solution and heated to 40° C. under a nitrogen atmosphere. The autoclave is purged with hydrogen sulfide, sealed, and stirred for 30 minutes.

After filtering through a 0.8 micron filter, the clear, colorless solution is found to contain 60 milligrams per liter cobalt and less than 8 milligrams per liter nickel.

EXAMPLE 13

Cobalt-nickel separation is obtained using the extractant Alamine 336. An aqueous solution containing 32.2 grams per liter cobalt, 32.6 grams per liter nickel and 199 grams per liter chloride, having a pH of 3.0 is contacted with an extractant containing 191 grams per liter Alamine 336 and 75 grams per liter tridecanol in kerosene, using the general procedure described in Example 4, except with three minute stirring times.

Results are as shown in Table IX.

TABLE IX

| Volume | | Cobalt, g/l | | Nickel, g/l | |
|---|---|---|---|---|---|
| Aqueous | Organic | Aqueous | Organic | Aqueous | Organic |
| 7.5 | 75 | 1.6 | 7.91 | 31.8 | <0.008 |
| 10 | 50 | 6.52 | 4.73 | 32.1 | <0.008 |
| 20 | 40 | 19.6 | 5.90 | 32.6 | <0.008 |
| 30 | 30 | 25.1 | 5.64 | 32.6 | <0.008 |
| 40 | 20 | 28.5 | 5.81 | 32.5 | <0.008 |

EXAMPLE 14

Stripping of cobalt from the extractant of the preceding example, loaded to a cobalt content of 5.40 grams per liter, is accomplished by mixing the extractant with water for three minutes, using the general procedure of Example 5. Results are obtained as in Table X.

TABLE X

| Volume, ml | | Cobalt, g/l | |
|---|---|---|---|
| Aqueous | Organic | Aqueous | Organic |
| 7.5 | 75 | 49.9 | 0.83 |
| 10 | 50 | 29.5 | 0.097 |
| 10 | 20 | 12.3 | <0.008 |

Various embodiments and modifications of this invention have been described in the foregoing description and examples, and further modifications will be apparent to those skilled in the art. Such modifications are included within the scope of the invention as defined by the following claims.

What is claimed is:

1. A method for the recovery of valuable components from a particulate catalyst material which contains compounds of metals on a support comprising aluminum oxide, which method comprises:
   (a) roasting the catalyst in the presence of oxygen;
   (b) reacting the roasted catalyst with sulfuric acid, in a single counter current digester, to produce a solution comprising aluminum and other metal ions;
   (c) separating other metals from aluminum; and
   (d) recovering a solution containing sulfate at approximately 1.5 times the molarity of aluminum.

2. The method defined in claim 1 wherein the catalyst materials are those utilized in the hydrorefining of hydrocarbons.

3. The method defined in claim 2 wherein the metals are selected from the group consisting of cobalt, nickel, molybdenum, tungsten and vanadium.

4. The method defined in claim 1 wherein roasting is conducted at a temperature between about 400° C. and about 900° C.

5. The method defined in claim 4 wherein roasting is conducted at a temperature between about 500° C. and about 650° C.

6. The method defined in claim 1 wherein oxygen is supplied by air.

7. The method defined in claim 1 wherein the solution of aluminum and other metal ions has a pH between about 2.0 and about 3.2.

8. The method defined in claim 7 wherein the solution of aluminum and other metal ions has a pH of about 3.0.

9. The method defined in claim 1 wherein other metals are separated from aluminum using sequential liquid-liquid extraction procedures.

10. A method for producing metal compounds from a particulate spent aluminum oxide-containing hydrocarbon refining catalyst, which comprises the steps of:
    (a) roasting the catalyst in an oxygen-containing atmosphere, at a temperature sufficient to substantially remove carbon from the catalyst;
    (b) reacting the roasted catalyst with sulfuric acid in a single counter-current digester to produce a solution having a pH above about 2;
    (c) separating other metal compounds from aluminum in the solution; and
    (d) recovering a solution which contains sulfate at approximately 1.5 times the molarity of aluminum.

11. The method defined in claim 10 wherein the catalyst comprises compounds of metals selected from the group consisting of molybdenum, cobalt, nickel, vanadium, or mixtures thereof, on a porous aluminum oxide support.

12. The method defined in claim 10 wherein roasting is conducted in the presence of air, at a temperature between about 400° C. and about 900° C.

13. The method defined in claim 10 wherein roasting is conducted at a temperature between about 500° C. and about 650° C.

14. The method defined in claim 11 wherein the solution produced in the digester has a pH between about 2.5 and about 3.2.

15. The method defined in claim 11 wherein other metals are separated from aluminum using sequential liquid-liquid extraction procedures.

16. The method defined in claim 15 wherein vanadium if present is separated with an extractant comprising an organophosphorus compound in a water-immiscible hydrocarbon solvent.

17. The method defined in claim 15 wherein molybdenum if present is separated with an extractant comprising a tertiary amine in a water-immiscible hydrocarbon solvent.

18. The method defined in claim 15 wherein cobalt and nickel if present are separated with an extractant comprising a dialkyl dithiophosphoric acid in a water-immiscible hydrocarbon solvent.

19. The method defined in claim 11 wherein cobalt and nickel if present are separated by precipitating with a material selected from the group consisting of hydrogen sulfide, water soluble sulfides, water soluble polysulfides, and mixtures thereof, and removing formed precipitate.

20. The method defined in claim 19 wherein the precipitate is dissolved in aqueous acid and cobalt is separated from nickel by liquid-liquid extraction, using an extractant comprising an organoamine compound in a water-immiscible solvent.

21. The method defined in claim 19 wherein the precipitate is dissolved in aqueous acid and nickel is separated from cobalt by liquid-liquid extraction, using an extractant comprising an oxime compound in a water-immiscible solvent.

22. A method for producing metal compounds from a particulate spent hydrocarbon refining catalyst comprising compounds of metals selected from the group consisting of molybdenum, cobalt, nickel, vanadium, or mixtures thereof, on a porous aluminum oxide support, which method comprises the steps of:
    (a) roasting the catalyst in an oxygen-containing atmosphere at a temperature between about 500° C. and about 650° C.;
    (b) reacting the roasted catalyst with sulfuric acid in a single counter-current digester to essentially completely dissolve the aluminum oxide and produce a solution having a pH between about 2.5 and about 3.2;
    (c) separating vanadium, if present, from the solution by extraction with a liquid extractant comprising an organophosphorus compound in a water-immiscible hydrocarbon solvent;
    (d) separating molybdenum, if present, from the solution by extraction with a liquid extractant comprising a tertiary amine in a water-immiscible hydrocarbon solvent;
    (e) separating cobalt and nickel, if present, from the solution by precipitating with a material selected from the group consisting of hydrogen sulfide, water soluble sulfides, water soluble poysulfides, and mixtures thereof,and removing formed precipitate; and
    (f) recovering a solution which contains sulfate at approximately 1.5 times the molarity of aluminum.

23. The method defined in claim 22 wherein the precipitate of step (e) is dissolved in aqueous acid and cobalt is separated from nickel by extraction with a liquid extractant comprising an organoamine compound in a water-immiscible solvent.

24. The method defined in claim 23 wherein the acid comprises hydrochloric acid.

25. A method for the recovery of valuable components from a particulate catalyst material which contains compounds of metals on a support comprising aluminum oxide, which method comprises:
    (a) roasting the catalyst in the presence of oxygen;
    (b) feeding the roasted catalyst into the top of a single digester,
    (c) passing sulfuric acid into said digester from a point near the bottom of said digester,
    (d) reacting said roasted catalyst and said sulfuric acid to produce a solution comprising aluminum and other metal ions and a sludge,
    (e) establishing a liquid level in said digester by controlling the removal of said solution from said digester, at a point below the top of said digester,
    (f) removing said sludge from the bottom of said digester, and
    (g) recovering a solution having a very low undissolved solids content and containing sulfate at approximately 1.5 times the molarity of aluminum.

26. The method of claim 25 further comprising maintaining a quantity of said roasted catalyst, in said digester, above said liquid level.

27. The method of claim 25 wherein said recovered solution in step (g) has an undissolved solids content of less than 2 percent by weight.

28. A method for the recovery of valuable components from a particulate catalyst material which contains compounds of metals on a support comprising aluminum oxide, which catalyst has been roasted in the presence of oxygen; which method comprises reacting said roasted catalyst and sulfuric acid to produce a solution comprising aluminum and other metal ions, by passing sulfuric acid into a single countercurrent digester, at a point near the bottom thereof, and allowing said sulfuric acid to rise through particles of said roasted catalyst; and recovering said solution containing sulfate at approximately 1.5 times the molarity of aluminum and having a very low undissolved solids content, by passing said solution through a filtration medium comprising a bed of larger particles of said roasted catalyst in the uppermost area of said digester.

29. The method of claim 28 wherein said recovered solution has an undissolved solids content of less than 2 percent by weight.

* * * * *